(12) United States Patent
Arimilli et al.

(10) Patent No.: US 7,089,364 B2
(45) Date of Patent: Aug. 8, 2006

(54) SYSTEM AND METHOD TO STALL DISPATCH OF GATHERED STORE OPERATIONS IN A STORE QUEUE USING A TIMER

(75) Inventors: Ravi Kumar Arimilli, Austin, TX (US); Robert Alan Cargnoni, Austin, TX (US); Hugh Shen, Austin, TX (US); Derek Edward Williams, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 327 days.

(21) Appl. No.: 10/825,188

(22) Filed: Apr. 15, 2004

(65) Prior Publication Data

US 2005/0251622 A1    Nov. 10, 2005

(51) Int. Cl.
*G06F 12/12* (2006.01)
(52) U.S. Cl. .......................... 711/133; 710/54; 711/122; 711/145; 712/225
(58) Field of Classification Search ..................... None
See application file for complete search history.

(56) References Cited

U.S. PATENT DOCUMENTS

| | | | | |
|---|---|---|---|---|
| 5,404,550 | A | * | 4/1995 | Horst ........................... 712/14 |
| 5,894,569 | A | * | 4/1999 | Arimilli et al. ............. 712/225 |
| 5,940,611 | A | * | 8/1999 | Arimilli et al. ............. 712/225 |
| 5,956,503 | A | * | 9/1999 | Arimilli et al. ............. 712/225 |
| 6,101,568 | A | * | 8/2000 | Richardson ................. 710/310 |
| 6,247,114 | B1 | * | 6/2001 | Trull ........................... 712/216 |

OTHER PUBLICATIONS

Pekkala et al., "Gathering Store Instructions In a Superscalar Processor", Sep. 1996, IBM Technical Disclosure Bulletin, vol. 39, No. 09, pp. 103-106.*

* cited by examiner

*Primary Examiner*—Donald Sparks
*Assistant Examiner*—Arpan Savla
(74) *Attorney, Agent, or Firm*—Casimer K. Salys; Dillon & Yudell LLP (57) ABSTRACT

A method and processor system that substantially enhances the store gathering capabilities of a store queue entry to enable gathering of a maximum number of proximate-in-time store operations before the entry is selected for dispatch. A counter is provided for each entry to track a time since a last gather to the entry. When a new gather does not occur before the counter reaches a threshold saturation point, the entry is signaled ready for dispatch. By defining an optimum threshold saturation point before the counter expires, sufficient time is provided for the entry to gather a proximate-in-time store operation. The entry may be deemed eligible for selection when certain conditions occur, including the entry becoming full, issuance of a barrier operation, and saturation of the counter. The use of the counter increases the ability of a store queue entry to complete gathering of enough store operations to update an entire cache line before that entry is dispatched to an RC machine.

20 Claims, 8 Drawing Sheets

SYSTEM AND METHOD TO STALL DISPATCH OF GATHERED STORE OPERATIONS IN A STORE QUEUE USING A TIMER

RELATED APPLICATION

The present invention is related to the subject matter of the following commonly assigned, co-pending U.S. patent application Ser. No. 10/825,189 entitled "METHOD FOR COMPLETING FULL CACHELINE STORES WITH ADDRESS-ONLY BUS OPERATIONS" filed concurrently herewith. The content of the above-referenced application is incorporated herein by reference.

BACKGROUND OF THE INVENTION

1. Technical Field

The present invention relates generally to data processing systems and specifically to processor-cache operations within data processing systems. Still more particularly, the present invention relates to improved gathering of processor-cache store operations to an entry of a store queue.

2. Description of the Related Art

Increasing efficiency of data operations at the processor-cache level is an important aspect of processor chip development. Modern microprocessors typically contain entire storage hierarchies (caches) integrated onto a single integrated circuit. For example, one or more processor cores containing L1 instruction and/or data caches are often combined with a shared on-chip L2 cache. In some designs, the directory portion of an L3 cache is also integrated on-chip with the data portion of the L3 cache residing in a separate external chip.

In systems with on-chip caches, processor-issued data store operations typically target only a small portion (i.e., 1-byte to 16-bytes) of a cache line compared to the entire cache line (typically 128-bytes). For example, it is possible for a processor-issued store operation to target only a single byte granule of a 128-Byte cache line to update, and cache line updates are completed via a combination of these individual store operations, which may occur sequentially. In order to increase efficiency, processor chips are often designed with a "store queue" that is typically placed between a processor core and the L2 cache. A store queue typically contains byte-addressable storage for a number of cache lines (usually 8 to 16 cache lines).

Figure 2:
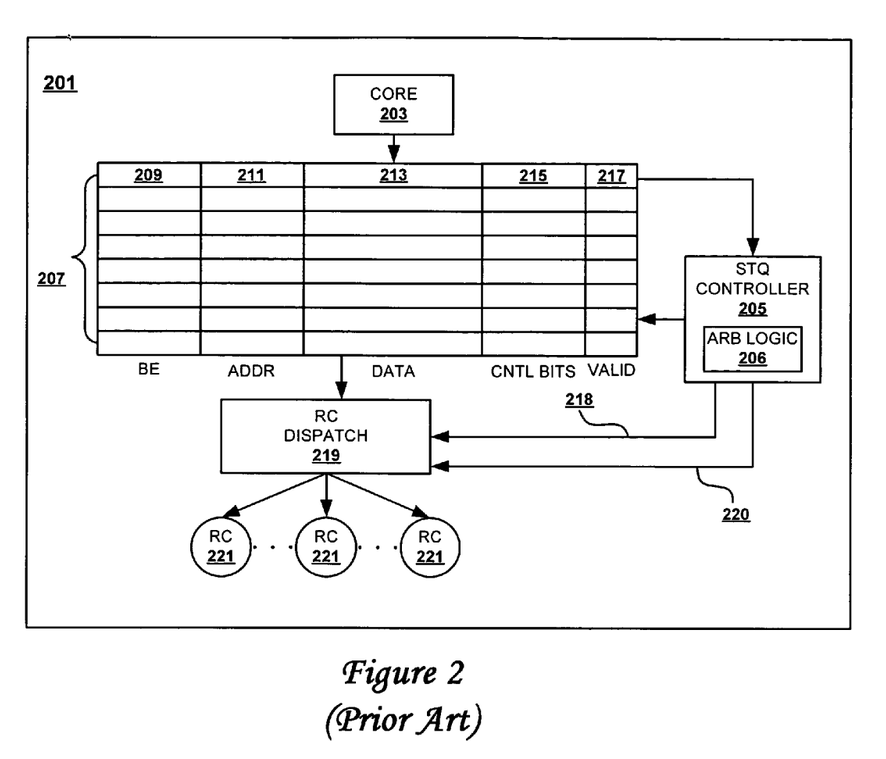
FIG. 2 is a prior art representation of processor components utilized to complete a store operation to an on-chip cache.

FIG. 2 illustrates a prior art representation of specific hardware and logic components of a processor chip that are utilized to complete data store operations. As illustrated, processor chip 201 includes a processor core 203, store queue 207 with store queue (STQ) controller 205, and read claim (RC) dispatch logic 219. STQ controller 205 includes arbitration logic 206 utilized for selecting entries from the store queue 207, as described below. RC dispatch logic 219 supports a series of RC machines 221, which complete the actual data store operations at the lower-level cache (not shown).

The store queue 207 provides several rows (entries) for temporarily storing and tracking processor-issued stores. Each row is divided into several columns that provide byte enable register 209, address register 211, data register 213, controls bits 215, and valid bit 217. Data register 213 and address register 211 store data issued from the processor core 203 and the corresponding data (memory) address, respectively. Byte enable register 209 includes a number of bookkeeping bits. Conventionally the number of bits corresponds to the number of individually addressable storage granules within a cache line. Thus, for example, for a 128-byte cache line entry and byte store operations, byte enable register 209 maintains 128 bits for tracking single-byte processor-issued stores. This enables tracking of specific bytes (or group of bytes) within a 128-byte cache line entry that is being updated by the processor.

Valid bit 217 indicates to STQ controller 205 when data within a particular row of the store queue 207 is valid, and valid bit 217 is checked before arbitration logic 206 selects a row of data (or an entry) to forward to RC Dispatch logic 219. Once a valid bit is set, arbitration logic 206 is able to select the entry regardless of whether additional stores to that cache line are being sent by the processor core. Control Bits 215 represents an assortment of additional bits that are utilized by STQ controller 205. The functionality of several of the above-described columns is referenced within the description of the data store operations below.

Store operations typically originate at the processor core 203 and are temporarily stored in an entry of the store queue 207. The store operations target a particular cache line (or portion of the cache line) identified by the address within the store operation, and the operation also provides data to be stored within the addressed portion of that cache line (e.g., byte 12).

The store operations update particular bytes within the cache line entry. Concurrent with these data updates, corresponding bits within byte enable register are set to track which bytes within the cache line entry have been updated by store operations. Typically, a series of store operations writing to a same entry in the store queue are absorbed by the store queue entry before the line is dispatched to the L2 cache. This absorption of multiple store operations into a single entry is referred to as "gathering" stores, since multiple different stores addressing the same cache line are "gathered" into an entry of the store queue buffer before the line is presented to the L2 cache for storage.

Figure 3A:
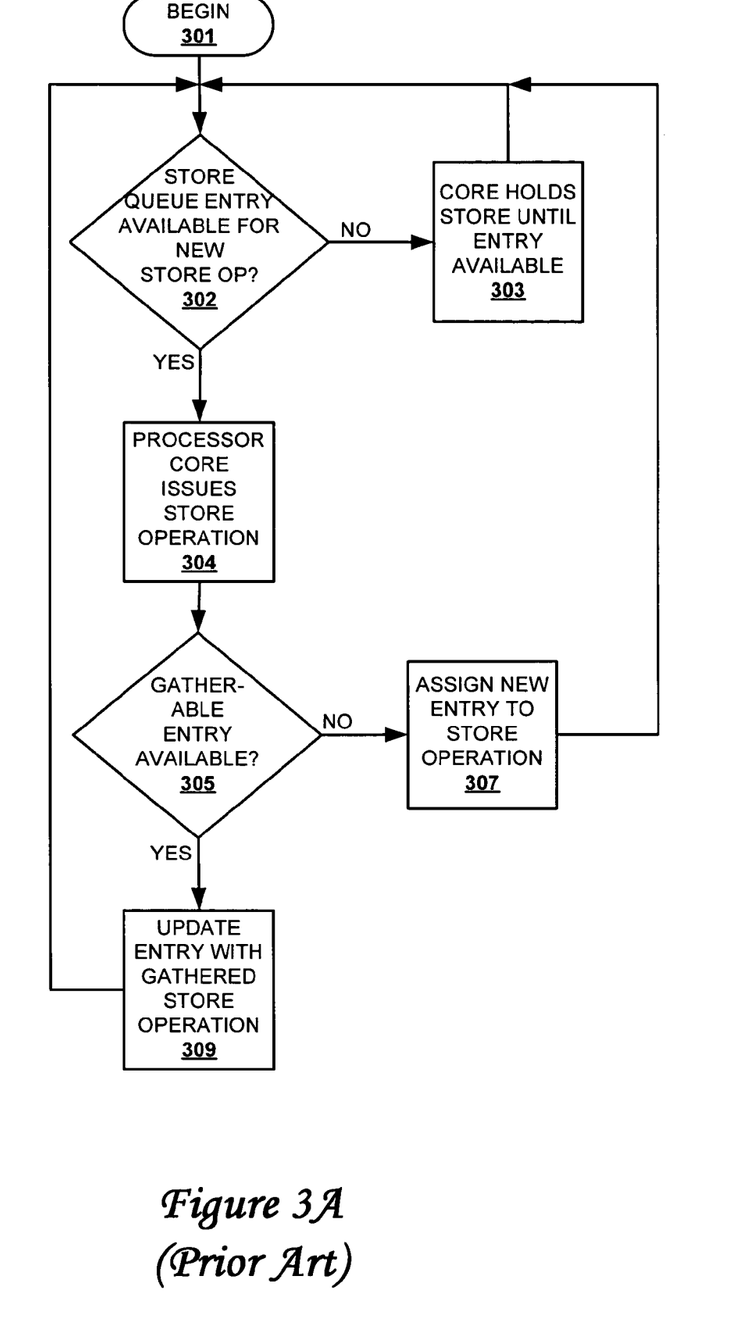
FIG. 3A is a flow diagram illustrating the process of storing data to an entry of a store queue according to prior art.

FIG. 3A illustrates a process by which store operations issued by a processor are assigned to an entry within the store queue. The process begins at step 301 and proceeds to step 302 at which a determination is made whether there is an available entry within the store queue to assign a next store operation. When all entries of the store queue have been assigned (i.e., there is no available entry to assign to a new store operation and no gatherable entry exists for that store operation), the processor core suspends issuance of new store operations to the queue until an entry becomes available, as indicated at step 303.

An entry becomes available when the contents of that entry are dispatched to an RC machine. That is, an entry becomes available when an older cache line entry is removed from the store queue and sent to the L2 cache for storage therein. A variety of different policies (some described below) may be utilized to determine when cache lines are moved from the store queue to be stored in the L2 cache. In conventional systems, a tracking mechanism is provided within the core and/or the store queue to track when there are available entries to assign to store operations being issued by the core. The core is thus able to suspend issuance of store operations when those operations cannot be buffered within the store queue.

Returning to decision step 302, when there is an available entry, the processor core issues a store operation to the store queue as shown at step 304. The store operation is received at the store queue, and a determination is made at step 305 whether a previously existing entry (for the same cache line address) is currently available for gathering the store operation. If, at step 305, there is no existing entry available to gather the store operation, a new entry is allocated to the store operation, as shown at step 307. However, when there is an existing entry that is gatherable, the entry is updated with the data of the store operation as shown at step 309.

An existing entry is usually available for gathering when the entry holding previously issued store operation(s) for the same cache line address has not yet been selected for dispatch to an RC machine. In conventional implementations, once an entry in the store queue has been assigned to a target cache line, subsequent stores targeting that cache line are gathered within that entry until a condition occurs that prevents further gathering of store operations to that entry. The STQ controller 205 controls when stores to a cache line are allowed to gather. For example, the STQ controller may prevent further gathering of stores to an entry when the entry is selected for dispatch. Also, gathering is typically stopped when a barrier operation is encountered, as is known to those skilled in the art.

Gathering stores is more efficient than individually storing single bytes within the L2 cache. This is because the RC machine's updating of a cache line with data from a store queue entry takes more cycles than the number of cycles required for updating the store queue entry with a new store operation. Also, each store operation at the L2 cache requires the RC machine to retrieve the entire cache line even when the store queue entry includes only a single store operation.

When a cache line entry is removed from the store queue to be sent to the L2 cache, the cache line entry is sent to an RC dispatch and assigned to an RC state machine, which updates the cache line of the L2 cache with the data from within the entry. Thus, for every RC machine assigned to a store operation, the entire cache line must be read and manipulated regardless of how many bytes of the cache line are actually being updated. It is thus more efficient to absorb multiple stores in the store queue entry before passing the line onto the L2 cache. Gathering stores also reduces the number of RC machine tenures required for store operations to a single cache line and also reduces the time required to update a cache line when multiple processor-issued stores update individual portions of the same cache line.

Figure 3B:
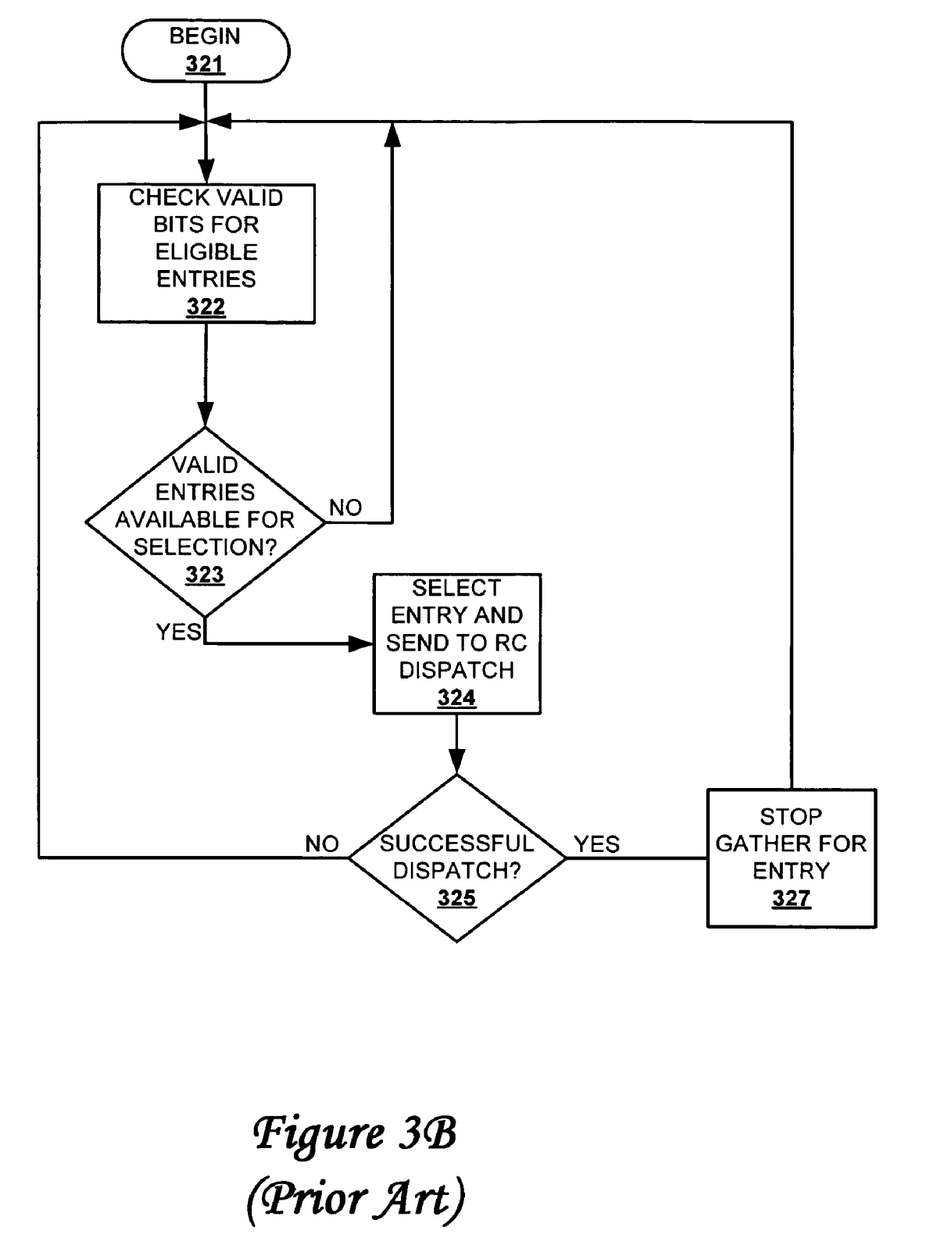
FIGS. 3B and 3C are flow diagrams illustrating two parts of the process of storing data to cache lines utilizing a store queue and RC machines according to prior art.
Figure 3C:
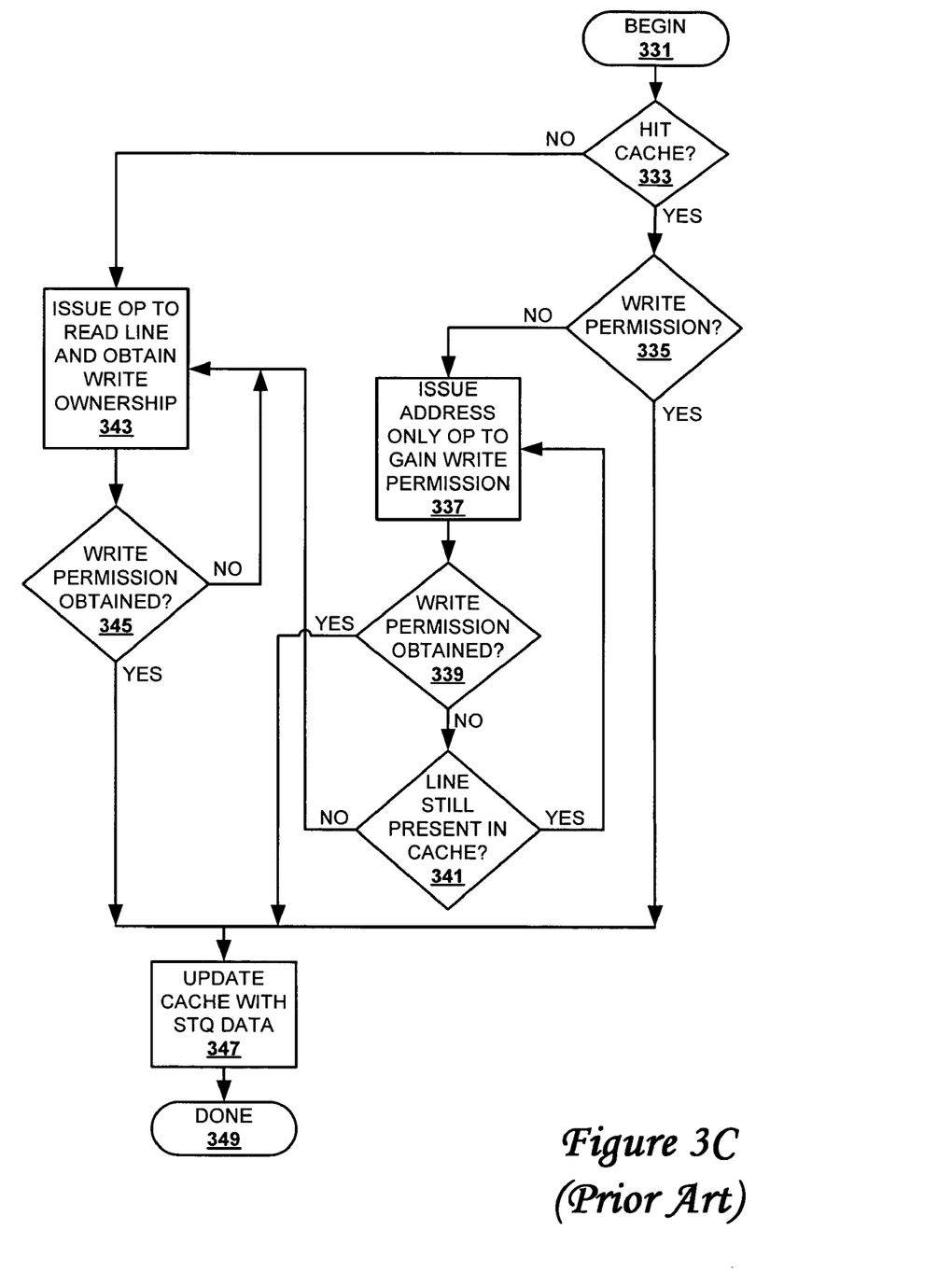

FIGS. 3B and 3C provide flow charts of the processes involved in completing a store operation from the store queue. FIG. 3B illustrates the general process for selecting an entry at the store queue for dispatch. The process begins at step 321 and proceeds to step 322, at which the STQ controller scans the valid bits of the entries to see which entries are eligible for dispatch. A determination is made at step 323 whether there are valid entries eligible for selection by the arbitration logic. When there are valid entries (i.e., entries with their valid bit 217 set/high), the arbitration logic selects an entry for dispatch from among all eligible entries and forwards the selected entry to the RC machine, as shown at step 324.

In determining which entry to select for dispatch, the arbitration logic looks at all the valid entries in the queue and determines, based on a set of architectural rules, which entries are eligible to be processed by the RC machine. For instance, an entry containing more recent stores cannot be processed before the entry with older stores to the same address, nor can store operations bypass barrier operations. The arbitration logic selects one of the eligible (valid) entries and signals the RC dispatch logic of the availability of that entry for dispatch to an RC machine. Conventional selection processes are typically via a round robin scheme amongst eligible entries.

Returning to FIG. 3B, a determination is made at step 325 whether the dispatch was successful. If the RC dispatch logic 219 accepts the request, the gathering of stores to that entry is stopped and the data within the entry is removed from the store queue, as depicted step 327. The RC dispatch 219 assigns the store to one of the RC machines 221 to complete the cache line update. If the RC dispatch rejects the request, the arbitration logic then selects another eligible store, if one is available, or tries again with the same entry if there are no others. When the dispatch was not successful, the process loops back to selecting a valid entry to send to the RC dispatch logic 219. For a successful dispatch, the valid bit, byte enable (BE) register, and other registers of the dispatched entry are reset, and the entry is made available for gathering a new set of store operations.

The RC machine 221 goes through several steps to update the L2 cache with the new store data. These steps are illustrated within the flow chart of FIG. 3C, which begins at step 331. The RC machine first determines at step 333 if a cache hit occurs, i.e., if the cache line is present in the L2 cache. If the line is not present in the cache, the RC machine places an address operation (with data request) on the system interconnect/bus that requests a copy of the cache line and write-permission for the cache line, as shown at step 343.

A determination is made at step 345 whether the request for write permission was successful. If the request was not successful, the request is reissued until the L2 cache is granted the necessary write permission. Notably, obtaining write permission when a miss occurs at the cache (i.e., the cache line is not present within the cache) requires a data operation to obtain a copy of the latest version of the cache line data. Also, in most instances, the coherency status of the other caches is updated/changed to indicate that the present L2 cache has current write permission.

Returning now to step 333, when the cache line is initially present within the L2 cache (i.e., a cache hit), a determination is made at step 335 whether there is permission to write to the cache line within the L2 cache. This check is required since the cache may not have permission to perform updates to the cache line, although the request by the RC machine hits within the cache. The RC machine thus issues an address-only operation on the bus to gain the write permission, as depicted at step 337.

A determination is made at step 339 whether the request for write permission was successful. If the request for write permission was not successful, a next determination is made at step 341 whether the line is still present within the L2 cache. In some instances (e.g., when the cache line request hits in the L2 cache but becomes stale before write permission can be obtained), a fetch of the data is required. When the line is still present in the L2 cache, the address-only write operation is retried. However, if the line is no longer present within the cache, the process shifts to step 343 which issues a request for both a copy of the line as well as write permission to the line.

All of the foregoing operations provide a copy of the targeted cache line within the L2 cache and provides the RC machine 221 with the necessary permissions to update the line. In general, the RC machine 221 only has to retrieve a copy of the data for the line when the line is not initially present within the cache. However, as described above, there are some cases where the cache line's data is updated by some other participant (processor, etc.) before the RC machine obtains write permission, and the RC machine must request a copy of the newly updated data from the other cache (or memory). When the cache line is present in the cache with sufficient write permission to immediately update the cache line data (i.e., a cache line hit with write permission—from step 335), no request for data and write permission is required to be issued to the system bus.

Returning to FIG. 3C, once the write permission is obtained and a current copy of the data is present to complete the updates, the RC machine retrieves the entire cache line from the cache and updates the portions of the line that are identified by the byte enable bits as having been updated within the store queue entry, as indicated at step 347. The process then ends as depicted at step 349.

Conventionally, the byte enable bits are utilized to select individual byte multiplexers (MUXes) for each byte of the cache line. The MUXes select either the old cache line data or the new data from the store queue entry based on which one of the byte enable bits are set. Finally, the updated cache line data is written back into the L2 cache with the data updates from the store queue and the RC machine is retired.

Current implementation of the gathering and entry selection processes within conventional store queues includes a number of built-in inefficiencies. For example, the arbitration logic that selects which entries to forward to the RC dispatch does not presently account for whether or not the entry being selected has gathered a full set of store operations to complete an update of the entire cache line. There is no consideration of whether the valid entries have had sufficient time to gather subsequent stores to the same store queue entry. The present operation of the store queue does not include any mechanism for allowing a sequence of stores targeting a same entry to gather before the entry is selected for dispatch. It is thus common for the arbitration logic to select a "valid" entry for dispatch while there are still incoming stores that are gatherable. Once an entry is dispatched to the RC machine, the STQ controller prevents any further gathering of stores to that entry, and the store queue is forced to allocate a second entry to the subsequent store operations updating the same cache line.

Processing of certain types of code, such as scientific code, typically yields sequential streams of stores which modify an entire cache line. Removing a partially full entry, while there are processor-issued stores still targeting that entry, yields inefficiencies at the gathering and cache-updating stage. Thus, whereas a single entry could complete a gather of all the stores to a cache line, two or more entries may be required to gather stores targeting portions of the same cache line. These multiple entries also require multiple RC machine tenures to complete the update of the L2 cache and result in longer latencies when completing updates to a single cache line.

The present invention recognizes the benefits of providing a more efficient gathering of stores to a single entry of a store queue. The invention further recognizes that it would be desirable to provide a method and system for gathering stores to an entry that substantially increases the likelihood of gathering a full set of stores for updating an entire cache line before the entry is selected for dispatch. A method and system that reduces the number of RC machine tenures when completing processor-updates to the lower-level cache would be a welcomed improvement. These and other benefits are provided by the invention described herein.

SUMMARY OF THE INVENTION

Disclosed is a method, system, and processor chip design for improving the gathering functionality of a store queue to enable an entire cache line of processor-issued store operations to be gathered within a store queue entry before the entry is dispatched to an RC machine. The store queue is designed with a timer/counter function associated with each entry. Each timer counts up to a pre-established number of clock ticks since the last gather of a store at the respective entry. The pre-established number of clock ticks is a design parameter and the number is selected to provide sufficient time for subsequent store operations issued proximate-in-time to a previous store operation that targets the same cache line to gather within the same store queue entry.

The counter starts counting when a first store operation is assigned a new entry, and the counter is restarted whenever a new store operation is gathered into the entry. If a new store operation is not placed within the entry before the time expires (e.g., the counter reaches the pre-established number of clock ticks), the arbitration logic is signaled that the entry is available for selection. The gathering of stores within the entry stops when the entry is selected for dispatch by an RC machine. Gathering is also stopped if a barrier operation is received.

Implementation of the invention increases the chances that a series of store operations targeting the same cache line will gather within a single entry before being selected for dispatch by the arbitration logic. A more efficient use of each store queue entry and subsequent reduction in the number of RC machine tenures at the lower level cache results.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT(S)

The present invention provides a method and processor-chip design/configuration by which a store queue entry is more often able to gather a full set of processor-issued stores prior to the entry being selected for dispatch by the arbitration logic of the store queue (STQ) controller. The invention maximizes the store gathering capabilities of a store queue entry to facilitate gathering of subsequently issued store operations within an already existing entry for the same cache line. The invention involves some enhancements and/or additions to the store queue mechanism, including the gathering mechanism/logic of the store queue and changes in the STQ controller to prevent early selection of an entry by the arbitration logic while that entry may still gather proximate-in-time processor-issued stores.

Figure 1:
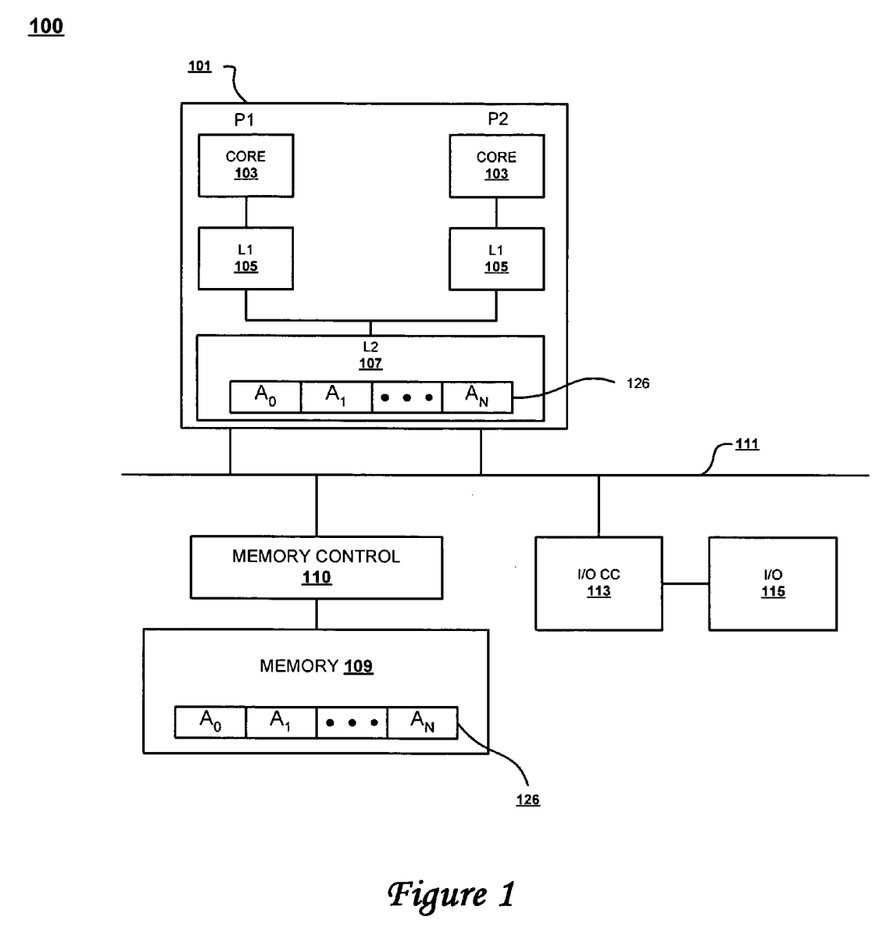
FIG. 1 is a block diagram illustrating a multiprocessor data processing system within which the various features of the invention may advantageously be completed.

With reference now the figures and in particular to FIG. 1, there is illustrated a multi-processor data processing system (MP) 100. MP 100 comprises several major components including processor chips 101, memory 109, and I/O device(s) 115. I/O device(s) have an associated I/O controller 113, while memory 109 has an associated memory controller 110 that controls access to and from memory 109.

Processor chips 101 are connected to memory 109 and I/O devices 115 via interconnect (system bus) 111 by which processor chips 101 communicate with each other and with memory 109, I/O devices 115, and other peripheral devices. Interconnect 111 is a bifurcated bus with a data bus for routing data and a separate address bus for routing address transactions and other operations.

Processor chips 101 each contain two processor cores 103, and onboard L1 cache 105 and shared L2 cache 107. According to the present invention, L2 caches 107 support intervention. Further, each cache is designed with a cache directory, an array of cache lines, and all data operations at each cache are completed according to a coherency protocol, such as a MESI coherency protocol.

The various features of the invention are carried out by logic components on processor chips 101 and affect buffering of store operations at the store queue and selection of entries for dispatch. For illustrative purposes, a sample cache line is provided within L2 cache, and the invention is described from the perspective of updating a cache line (A) in the L2 cache with store operations issued by a processor core and temporarily buffered in a store queue entry. As illustrated within L2 cache 107 of FIG. 1, exemplary cache line A 126 may contain multiple blocks/granules of data, corresponding to individual bytes, words, double words, etc., each of which may be the target of an update by a processor-issued store operation. The specific size of each cache line 126 and number of updatable data blocks/granules may differ from system to system, and the exact parameters utilized within the invention are adjusted accordingly to provide the general functionality described herein. While the present invention is described with specific reference to the L2 cache within a multi-level cache architecture, it is understood that the cache architecture need not be a multi-level one.

The present invention is described with reference to MP 100 and component parts of MP 100 illustrated by FIG. 1 and FIG. 4 (described below), but the present invention may be applied to different configurations of data processing systems that are not necessarily conventional. As an example, the invention may be implemented within a non-uniform memory access (NUMA) system, wherein the system memory (RAM) is divided among two or more memory arrays (having separate memory controllers connected to the system bus) and allocated among the processing units. Also, MP 100 could include new hardware components not shown in FIG. 1, or have a novel interconnect architecture for existing components. MP 100 may also have a different number of processing units. Those skilled in the art will therefore appreciate that the present invention is not limited to the generalized system shown in FIG. 1.

Figure 4:
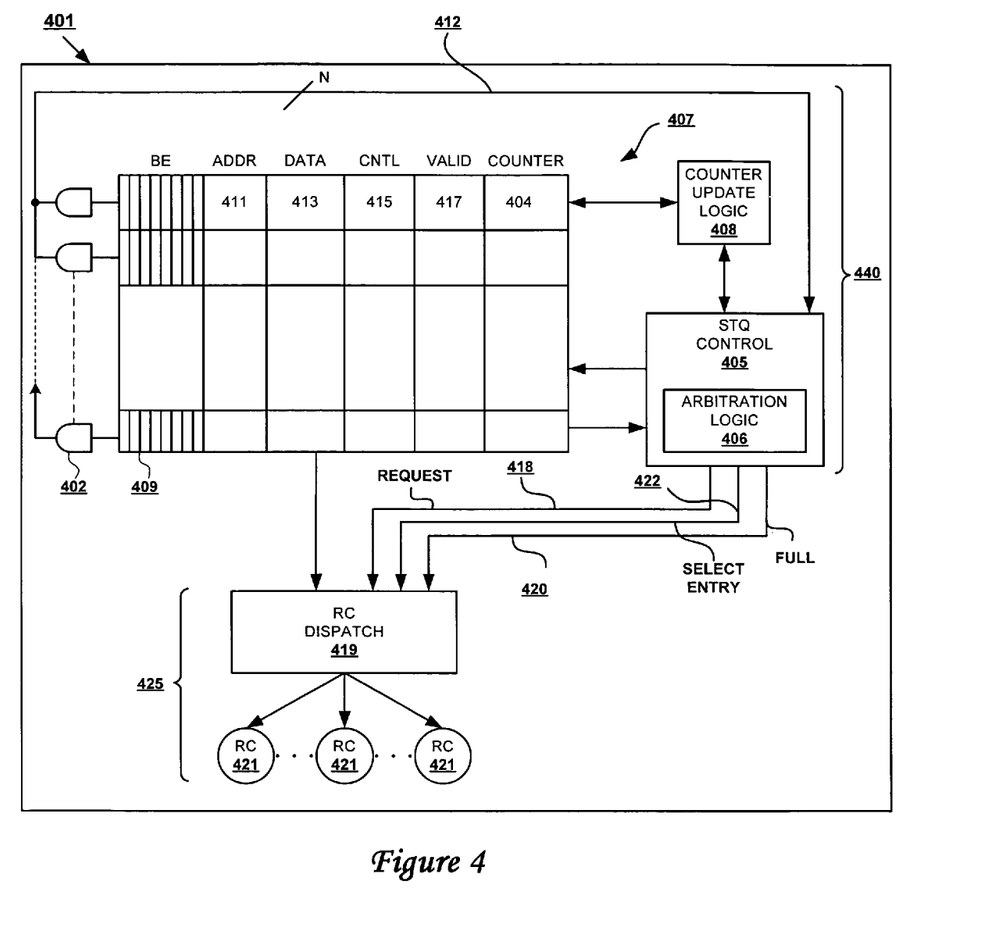
FIG. 4 is a block diagram of a store queue configured with AND logic and counters utilized to enable more efficient gathering of store operations within a store queue entry according to one embodiment of the invention.

While the invention is practiced within the general data processing system 100 of FIG. 1, the particular implementation features of the invention are provided within the store queue and associated components of the processor chip, as exemplified by FIG. 4. Implementation of the invention requires certain enhancements to the store queue and STQ controller.

Unlike the prior art configuration of FIG. 2, several enhancements are provided within the design of the processor chip 401, particularly the store queue 407. Among these enhancements are additional logic components that: (1) tracks an elapsed time since a last gather to an entry; (2) enables an entry to complete gathering store operations until the entry is full or one of several identified conditions occur; and (3) signals that the entry is ready to be selected for dispatch once the entry is full or one of the conditions occurs. In one implementation, the invention provides changes to the store queue arbitration logic 406 to ignore entries that may still be gathering stores. Also additional logic has been added to stop waiting for gathering when certain conditions occur that makes waiting to gather counterproductive.

With specific reference to FIG. 4, there is illustrated a store queue mechanism with a store queue 407 that includes the standard registers for storing information, namely address register 411, data register 413, control bits 415, valid bit 417, and byte enable register 409. As shown, byte enable register 409 contains a number of bits, each corresponding to a smallest size of store granule within the data register 413. For simplicity, the invention will be described with cache lines having a length/capacity of 128-bytes that are updated via a plurality of processor-issued store operations.

Each entry of the store queue is provided with a counter that is utilized to track the elapsed time since the last gather of a store operation to a particular entry. As illustrated by FIG. 4, store queue includes an additional counter register 404 associated with each entry. Counter register 404 maintains a counter (or timer) that is linked to the system clock, and each active counter is incremented every clock cycle. Associated with the counters within counter register 404 is counter update logic 408. Counter update logic 408 is responsible for resetting/restarting the counter and also for responding to a counter that reaches saturation before a next store operation is received for an entry that is not yet full. In one implementation, the counter begins at zero and is incremented to a pre-set saturation point. The counter is reset to zero when a new entry is started or when an existing entry gathers another store operation.

The invention assumes that when the counter reaches a threshold saturation point, the entry may not likely gather any more store operations and there is little benefit to be gained from waiting longer. Notably, however, the entry continues to gather until the entry is successfully dispatched to an RC machine. Thus, although the counter that has reached saturation, the counter may be reset to allow the entry to continue gathering if another store operation is gathered to the entry before the entry is selected for dispatch.

When one of a number of conditions occurs, the counter may be stopped and the entry is immediately deemed eligible for dispatch (i.e., the arbitration logic is signaled that the entry may be selected for dispatch). The entry is also deemed eligible for dispatch when the counter reaches saturation. The arbitration logic may then select the entry to dispatch to an RC machine. When an entry that is deemed eligible for dispatch gathers another store operation before the entry is selected by the arbitration logic, the entry is re-labeled ineligible for dispatch and the counter is reset. In an alternate implementation, however, the entry is allowed to gather until selected for dispatch and the counter is not reset. Resetting the counter operates as a trigger to prevent selection of the entry since the arbitration logic is programmed to not select an entry unless the counter is stopped or saturated.

Figure 5A:
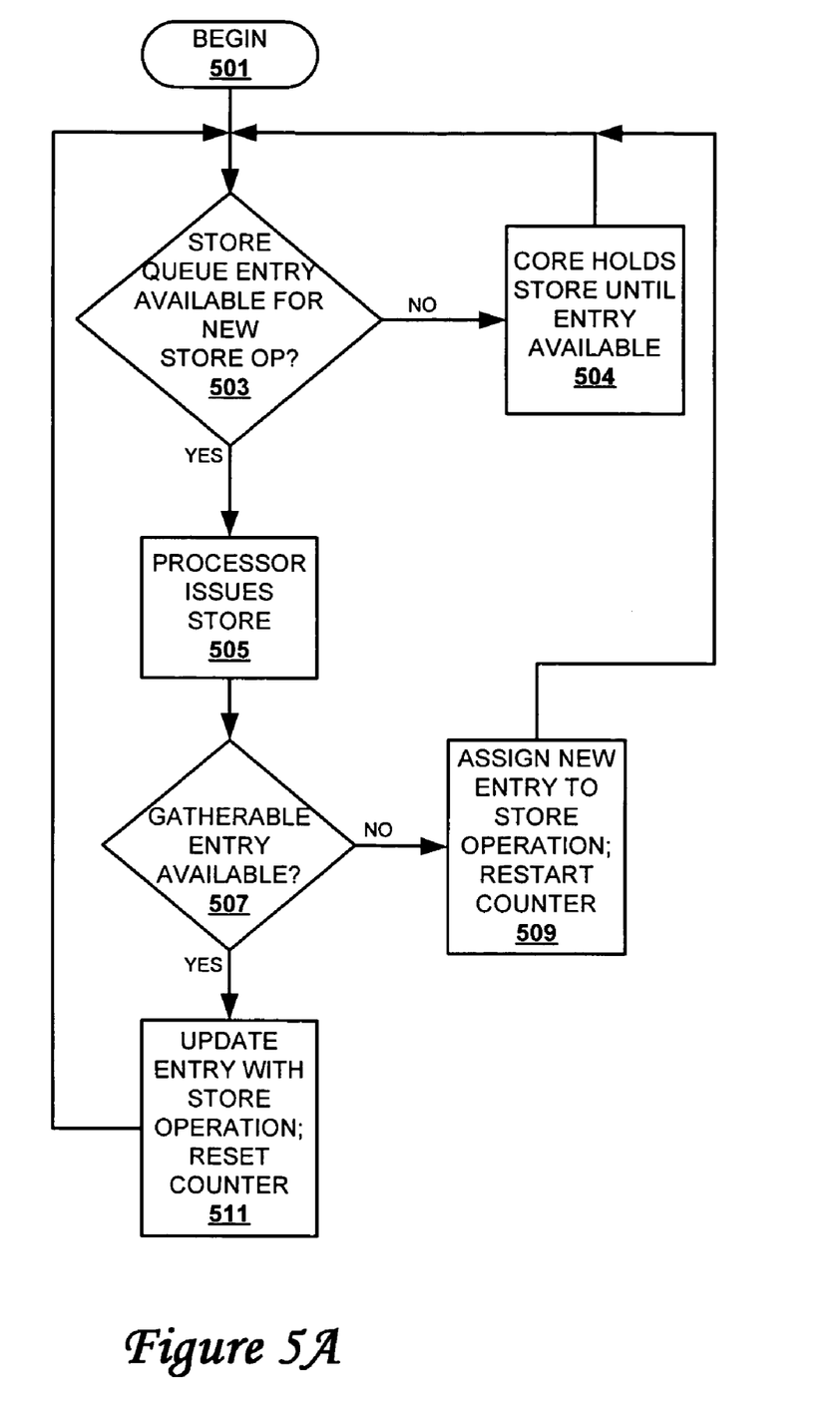
FIG. 5A is a flow chart of the process of incrementing the counters within the store queue of FIG. 4 in accordance with one implementation of the invention.

FIG. 5A is a flow chart illustrating the process whereby a counter is utilized to track receipt and gather of new store operations to a store queue entry. The process begins at step 501 and proceeds to step 503 at which a determination is made whether there is an available entry within the store queue to assign a next store operation. When all entries of the store queue have been assigned (i.e., there is no available entry to assigned to a new store operation and no gatherable entry exists for that store operation), the processor core suspends issuance of new store operations to the queue until an entry becomes available, as indicated at step 504.

Returning to decision step 503, when there is an available entry, the processor core issues a store operation to the store queue as shown at step 505. The store operation is received at the store queue, and a determination is made at step 507 whether a previously existing entry (for the same cache line address) is currently available for gathering the store operation. If, at step 507, there is no existing entry available to gather the store operation, a new entry is allocated to the store operation and the associated counter is restarted, as shown at step 509. The counter of the entry begins incrementing to track an elapsed time since the last gather. However, when there is an existing entry that is gatherable, the entry is updated with the data of the store operation and the counter is reset as shown at step 511.

The counter update logic monitors for one of a number of conditions to stop the counter and signal that an entry is eligible for dispatch. As described above, the primary reason for indicating an entry may be selected for dispatch is that the counter has reached saturation. A second condition that causes the counter to be stopped is the issuance of a barrier operation. Encountering a barrier operation stops all gathering and each entry is marked as "closed" to gathering. Since there is no possibility of the entries gathering any more stores, the entries are also immediately deemed eligible for dispatch. A third reason for stopping the counter is an issued load operation hitting the store queue entry. For architectural reasons, younger loads are not allowed to be completed before older stores to the same address. Whenever a load targets the same address as the cache line address of the store queue entry, the system marks the entry eligible for dispatch to allow the load to complete quickly.

A fourth reason is that the entry has become "full". Once the queue entry has gathered a full set of store operations that update an entire cache line, the entry may be deemed eligible for dispatch. With scientific code, an entire cache line of stores are typically sent in sequence and it is very unlikely for the same cache line to receive another processor update before the previous update is completed. Thus, the invention recognizes that in all probability no more store operations to this cache line will be sent down from the core for some time.

Determining when an entry is full is the focus of the co-pending, related patent application, Ser. No. 10/825,189, which has been incorporated herein by reference. When this feature is incorporated into the present invention, an additional modification is made to the store queue, as illustrated by FIG. 4. Thus, in addition to the counter registers 404, the bookkeeping logic of the store queue is extended to include programmable comparators and the STQ controller logic is modified to support receipt of a signal that the entry is full and issuance of a full signal to the RC dispatch logic. As illustrated by FIG. 4, an AND gate 402 (or series of AND gates) is coupled to each byte enable register 409. AND gate 402 is utilized to determine when a data register (of the entry) within the store queue is full. AND gate output signal 412 is provided as an input to STQ controller 405. STQ controller is designed with additional logic to respond to selection of an entry when AND gate output signal 412 indicates that the entry is full. In one implementation, the additional logic marks the entry as eligible for dispatch and signals the RC mechanism 425 of the full status of the selected entry.

In an alternate embodiment, valid bit 417 is extended to include two bits, with a first bit indicating the conventional "entry valid" status and the second bit indicating an "entry full" status. This provides a valid/full register in lieu of the valid bit, and the valid/full register tracks the two parameters associated with the store queue entry. With this configuration, the AND output 412 is provided to the valid/full register and sets the associated bit to a logic high when the data register within the entry is full. The value of this bit is then utilized by the STQ controller 405 to determine the condition of the entry (full or not) when the entry is forwarded to the RC dispatch 419 of RC mechanism 425. In one implementation, a pre-selected control bit 415 is utilized as the entry full bit.

When an entry is marked as eligible for dispatch, the arbitration logic selects one of the eligible entries and issues a request signal to the RC dispatch along with the number of the entry. RC dispatch 419 receives three inputs from the STQ controller 405, request signal 418, select entry (identifier) 422 and full entry signal 420 as an input signal from STQ Controller 405. Full entry signal 420 informs the RC dispatch 419 when the entry contains a full set of store operations. In one embodiment, STQ controller 405 includes a switch or other mechanism for activating full line 420 when select entry 422 signals a selection of an entry that will update a full cache line.

In an alternate embodiment, full entry signal 420 is an extension of AND output 412 received by STQ controller 405 and automatically alerts RC dispatch 419 when the select entry 418 is a full entry. Notably, alternate embodiments may utilize different combinations of logic components (other than AND gates) to determining when a cache line is full. These embodiments may also provide a different response to a full line signal other than making an entry eligible for dispatch.

Figure 5B:
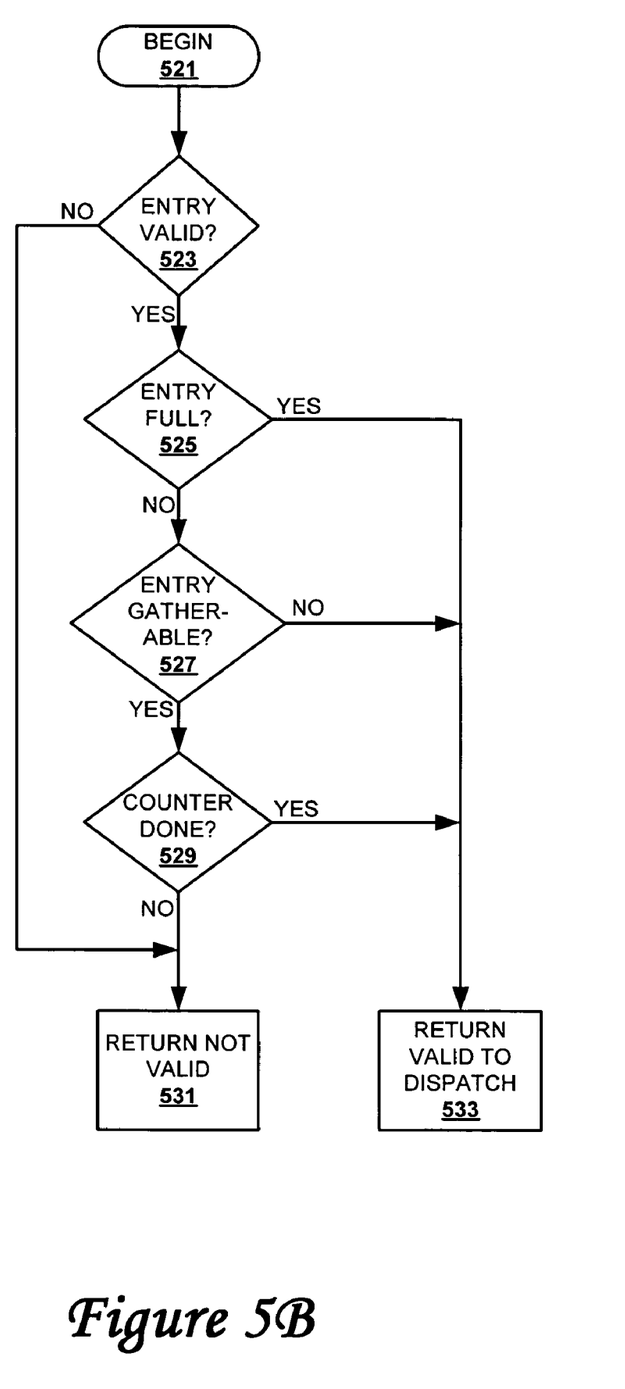
FIG. 5B is a flow chart of the process of determining when an entry is eligible for dispatch from the store queue of FIG. 4 in accordance with one implementation of the invention.

FIG. 5B is a flow chart depicting the process of determining when an entry is eligible for dispatch using the counter and associated functionality. The various steps are actually completed in parallel for all entries and the store queue utilizes the combined results of the various steps to select completed entries to send to the RC dispatch. The process begins at step 521 and proceeds to step 523 at which a determination is made whether an entry of the store queue is tagged as valid (i.e., the valid bit is set). When the entry is valid, a next determination is made at step 525 whether the entry is full (i.e., the AND output signal is high). When the entry is not full, a next determination is made at step 527 whether the entry is gatherable. An entry is initially assumed to be gatherable when there is an existing entry within the store queue and no barrier operations (e.g., SYNC) have been issued following the last gather by that entry. Assuming the entry is gatherable, a next determination is made at step 529 whether the counter has reached a saturation point.

When the counter has not reach a saturation point, the entry is not full, and the entry is gatherable, the logic returns a not eligible to dispatch signal to the arbitration logic at step 531. This indicates that the entry is not yet ready to be selected by the STQ controller for dispatch. However, when the entry is full, is not gatherable, or the counter has reached a saturation point, an eligible to dispatch signal is returned to the STQ controller, as shown at step 533.

The specific features and operations associated with the processes at the RC machines and STQ controller in determining how to process a full cache line is provided by the related application, the entire content of which has previously been incorporated herein by reference. The above enhancements substantially reduce the number of RC machine tenures for processor-issued store operations due to improved gathering of store operations. Also, the present invention provides a more efficient implementation of cache line updates via RC machines and removes the inefficiencies built into conventional methods when an entry is removed before gathered stores can complete the update of the entry.

While the invention has been particularly shown and described with reference to a preferred embodiment, it will be understood by those skilled in the art that various changes in form and detail may be made therein without departing from the spirit and scope of the invention. For example, although the invention is described with actual counter registers attached to each entry, other implementations may be provided that enable a tracking of time since last gather without an actual saturation counter. These alternate implementations all fall within the scope of the invention.

What is claimed is:

1. In a data processing system with a processor chip that includes a processor core, a store queue (STQ) mechanism with a store queue, and RC dispatch logic, a method for improving gathering capabilities for entries of the store queue that gather processor-issued store operations, said method comprising:
    gathering data of a first processor-issued store operation to an entry of the store queue;
    activating a timer to track elapsed time from a completion of the gathering step;
    when said timer reaches a pre-established threshold for elapsed time, signaling arbitration logic that said entry is eligible for selection for dispatch to the RC dispatch logic; and
    when a second processor-issued store operation gathers to the entry before said pre-established threshold for elapsed time is reached:
        holding off tagging said entry as eligible for dispatch; and
        restarting said timer to track elapsed time from a completion of said gather of the second processor-issued store operation.

2. The method of claim 1, further comprising:
    monitoring for a receipt of a barrier operation from said processor core; and
    when a barrier operation is received,
        tagging all active entries as eligible for dispatch; and
        preventing further gathering to said active entries, wherein a subsequent store operation targeting a cache line associated with on of said active entries is assigned a new entry within said store queue; and
        stopping a respective timer for each active entry.

3. The method of claim 1, further comprising:
    tracking gathers to said entry to determine when said entry contains a full set of store operations to update an entire cache line;
    when said entry contains a full set of store operations, signaling said entry as eligible for dispatch independent of a current status of the timer for that entry, wherein a new gather to said entry does not affect the entry's eligibility for dispatch.

4. The method of claim 1, further comprising:
    monitoring said entry to determine when said entry is still gatherable;
    when said entry is no longer gatherable,
        signaling said entry as eligible for dispatch; and
        stopping said timer for the entry.

5. The method of claim 4, wherein said timer is a counter that increments each clock tick of a system clock within said data processing system and said threshold for elapsed time is a saturation value of said counter, wherein said counter increments to saturation unless a new gather occurs or said counter is stopped.

6. The method of claim 5, wherein said STQ mechanism comprises a STQ controller and said counter has an associated counter logic that activates, resets, and stops said counter, wherein said counter logic further signals said STQ controller when said counter has reach said threshold or is stopped.

7. A processor chip for utilization within a data processing system having a memory hierarchy, said processor chip comprising:
    a processor core;
    a store queue having multiple entries, each having at least an address register and a data register for storing address and data of a store operation issued by the processor core;
    a store queue (STQ) controller having an associated arbitration logic, wherein said STQ controller monitors said store queue and identifies when an entry is eligible to be selected for dispatch by the arbitration logic; and
    a plurality of timers and an associated timer logic, said plurality of timers being each assigned to an entry and utilized for tracking elapsed time since a last gather of a store operation to that entry; and
    logic for signaling an entry as eligible to be selected for dispatch when the timer associated with that entry reaches a pre-established threshold before another store operation gathers into the entry.

8. The processor chip of claim 7, further comprising:
    logic for gathering data of a first processor-issued store operation to the entry;
    logic for activating the timer to track elapsed time from a completion of the gather of the first processor-issued store operation;
    when a second processor-issued store operation gathers to the entry before said pre-established threshold for elapsed time is reached:
        logic for holding off tagging said entry as eligible for dispatch; and
        logic for restarting said timer to track elapsed time from a completion of said gather of the second processor-issued store operation.

9. The processor chip of claim 7, further comprising:
    logic for monitoring for a receipt of a barrier operation from said processor core; and
    when a barrier operation is received,
        logic for tagging all active entries as eligible for dispatch; and
        logic for preventing further gathering to said active entries, wherein a subsequent store operation targeting a cache line associated with on of said active entries is assigned a new entry within said store queue; and logic for stopping a respective timer for each active entry.

10. The processor chip of claim 7, further comprising:
logic for tracking gathers to said entry to determine when said entry contains a full set of store operations to update an entire cache line;
logic that, when said entry contains a full set of store operations, signals said entry as eligible for dispatch independent of a current status of the timer for that entry, wherein a new gather to said entry does not affect the entry's eligibility for dispatch.

11. The processor chip of claim 7, further comprising:
logic for monitoring said entry to determine when said entry is still gatherable;
when said entry is no longer gatherable,
logic or signaling said entry as eligible for dispatch; and
logic stopping said timer for the entry.

12. The processor chip of claim 7, wherein said timer is a counter that increments each clock tick of a system clock within said data processing system and said threshold for elapsed time is a saturation value of said counter, wherein said counter increments to saturation unless a new gather occurs or said counter is stopped.

13. The processor chip of claim 12, wherein said timer logic that activates, resets, and stops said counter, wherein said timer logic further signals said STQ controller when said counter has reach said threshold or is stopped.

14. The processor chip of claim 7, further comprising logic that, when said timer reaches a pre-established threshold for elapsed time, said logic signals the arbitration logic that said entry is eligible for selection for dispatch.

15. A data processing system comprising:
a processor chip that includes:
a processor core;
a store queue having multiple entries, each having at least an address register and a data register for storing address and data of a store operation issued by the processor core;
a store queue (STQ) controller having an associated arbitration logic, wherein said STQ controller monitors said store queue and identifies when an entry is eligible to be selected for dispatch by the arbitration logic; and
a plurality of timers and an associated timer logic, said plurality of timers being each assigned to an entry and utilized for tracking elapsed time since a last gather of a store operation to that entry; and
logic for signaling an entry as eligible to be selected for dispatch when the timer associated with that entry reaches a pre-established threshold before another store operation gathers into the entry; and
a memory hierarchy coupled to said processor chip.

16. The data processing system of claim 15, wherein said processor chip further includes:

logic for gathering data of a first processor-issued store operation to the entry;
logic for activating the timer to track elapsed time from a completion of the gather of the first processor-issued store operation;
when a second processor-issued store operation gathers to the entry before said pre-established threshold for elapsed time is reached:
logic for holding off tagging said entry as eligible for dispatch; and
logic for restarting said timer to track elapsed time from a completion of said gather of the second processor-issued store operation.

17. The data processing system of claim 15, wherein said processor chip further includes:
logic for monitoring for a receipt of a barrier operation from said processor core; and
when a barrier operation is received,
logic for tagging all active entries as eligible for dispatch; and
logic for preventing further gathering to said active entries, wherein a subsequent store operation targeting a cache line associated with on of said active entries is assigned a new entry within said store queue; and
logic for stopping a respective timer for each active entry.

18. The data processing system of claim 15, wherein said processor chip further includes:
logic for tracking gathers to said entry to determine when said entry contains a full set of store operations to update an entire cache line;
logic that, when said entry contains a full set of store operations, signals said entry as eligible for dispatch independent of a current status of the timer for that entry, wherein a new gather to said entry does not affect the entry's eligibility for dispatch.

19. The data processing system of claim 15, wherein said processor chip further includes:
logic for monitoring said entry to determine when said entry is still gatherable;
when said entry is no longer gatherable,
logic or signaling said entry as eligible for dispatch; and
logic stopping said timer for the entry.

20. The data processing system of claim 15, wherein:
said timer is a counter that increments each clock tick of a system clock within said data processing system and said threshold for elapsed time is a saturation value of said counter, wherein said counter increments to saturation unless a new gather occurs or said counter is stopped; and
said timer logic that activates, resets, and stops said counter, wherein said timer logic further signals said STQ controller when said counter has reach said threshold or is stopped.

* * * * *